US005971539A

United States Patent [19]

Kobayashi

[11] Patent Number: 5,971,539

[45] Date of Patent: Oct. 26, 1999

[54] LENS-TO-TEMPLE JOINT STRUCTURE FOR A PAIR OF EYEGLASSES

[75] Inventor: Mitsuo Kobayashi, Fukui-ken, Japan

[73] Assignee: Yugen Kaisha Mana Japan, Fukui-ken, Japan

[21] Appl. No.: 09/102,636

[22] Filed: Jun. 23, 1998

[30] Foreign Application Priority Data

Dec. 26, 1997 [JP] Japan .................................... 9-359820

[51] Int. Cl.[6] ........................................ G02C 5/22

[52] U.S. Cl. .............................. 351/153; 351/119; 16/228

[58] Field of Search .................................... 351/119, 121, 351/153; 16/228

[56] References Cited

U.S. PATENT DOCUMENTS

| | | | |
|---|---|---|---|
| 4,076,394 | 2/1978 | Nakamura | 351/153 |
| 5,739,892 | 4/1998 | Kobayashi | 351/153 |
| 5,791,015 | 8/1998 | Wandinger | 351/153 |

FOREIGN PATENT DOCUMENTS

| | | |
|---|---|---|
| 60-70825 | 5/1985 | Japan . |

*Primary Examiner*—Huy Mai
*Attorney, Agent, or Firm*—Nikaido, Marmelstein Murray & Oram, LLP

[57] ABSTRACT

A part-to-part joint structure for fixing a first eyeglasses part to rotate relative to a second eyeglasses part in a pair of eyeglasses is provided comprising: (a) a ring-like piece having a joint extension integrally formed thereto for fixing to the first eyeglasses part; (b) a hammer head-like projection integrally connected to the second eyeglasses part to be press-fitted in the ring-like piece; and (c) an annular bush of a flexible material, the annular bush being so sized that the annular bush may be press-fitted in the ring-like piece, and the hammer head-like projection may be press-fitted in the annular bush, thereby fixing the second eyeglasses part rotatably to the first eyeglasses part, wherein at least one of the ring-like piece and the annular bush has a horizontal slot made therein for permitting the second eyeglasses part to rotate in a limited range, relative to the first eyeglasses part.

12 Claims, 5 Drawing Sheets

LENS-TO-TEMPLE JOINT STRUCTURE FOR A PAIR OF EYEGLASSES

BACKGROUND OF THE INVENTION

1. Field of the Invention

The present invention relates to a lens-to-temple joint structure for fixing a temple rotatably to each lens in a pair of eyeglasses.

2. Description of Related Art

A conventional lens-to-temple joint structure as disclosed in Japanese Utility Model 60-70825 uses a lens-fastening piece having a hinge-half soldered thereto and a temple-fastening piece having a counter hinge-half soldered thereto, and the temple is rotatably fixed to the lens by coupling the hinge-half of the lens-fastening piece to the counter hinge-half of the temple-fastening piece.

The defects of such conventional lens-to-temple joint structure are: the temples are liable to lose the pleasing tightness in folding the temples relative to the front of the frame in a pair of eyeglasses, thus permitting the temples to rotate loosely relative to the front of the frame; and the soldering space which is occupied by the hinge-half of the lens-fastening or temple-fastening piece is too large to permit these pieces to be soldered at an increased efficiency, and accordingly the manufacturing efficiency is lowered.

In case of a pair of rimless glasses using fine temples the hinge-halves must be reduced in size accordingly, and the so small-sized hinge-halves are difficult to be produced, and are fragile because of their thinness.

SUMMARY OF THE INVENTION

One object of the present invention is to provide a part-to-part joint structure, particularly to a lens-to-temple joint structure, which is simple and strong, requiring neither spot-welding nor soldering.

To attain this object a part-to-part joint structure for fixing one eyeglasses part rotatably to another eyeglasses part in a pair of eyeglasses according to the present invention comprises a ring-like piece having a joint extension integrally formed thereto for fixing to one eyeglasses part and a hammer head-like projection integrally connected to another eyeglasses part to be press-fitted in the ring-like piece, thereby fixing the another eyeglasses part rotatably to the one eyeglasses part. The word "eyeglasses part" used in the specification and claims includes a temple, a fastening piece, a bar, a nose pad, a box-like adapter and any other part used in a pair of eyeglasses.

A lens-to-temple joint structure for fixing a temple rotatably to each lens in a pair of eyeglasses according to the present invention comprises a ring-like piece having a joint extension integrally formed thereto for fixing to the lens and a hammer head-like projection integrally connected to the temple to be press-fitted in the ring-like piece, thereby fixing the temple rotatably to the lens.

With this arrangement the temple can be rotatably fixed to the front or lens simply by press-fitting the hammer head-like projection into the ring-like piece.

The lens-to-temple joint structure may further comprise an annular bush of a flexible material such as a synthetic resin, the annular bush being so sized that it may be press-fitted in the ring-like piece, and that the hammer head-like projection may be press-fitted in the annular bush.

The intervening annular bush between the ring-like piece and the hammer head-like projection has the effect of increasing the friction against the rotation of the temple relative to the front, thereby preventing the undesired rotation of the temple relative to the front and at the same time, slipping-off of the temple from the ring-like piece.

The ring-like piece and/or the annular bush may have a slot made therein for permitting the temple to rotate in a limited range.

With this arrangement the temple can stop its rotation at a predetermined position, and the pleasing tightness with which the temple can be rotated relative to the front cannot be lost because of additional significant friction caused by the temple moving in the slot.

According to another aspect of the present invention a lens-to-temple joint structure comprises a ring-like piece having a joint extension integrally formed thereto for fixing to the lens and a hammer head-like projection integrally connected to the temple to be press-fitted in the ring-like piece, the ring-like piece having an L-shaped slot opening vertically at its top and/or bottom side and opening horizontally on its circumference, thereby permitting the hammer head-like projection to rotate, but preventing it from slipping off from the ring-like piece.

With this arrangement the temple can be easily fixed to the lens simply by press-fitting, requiring no screws.

Other objects and advantages of the present invention will be understood from the following description of preferred embodiments of the present invention, which are shown in accompanying drawings.

DESCRIPTION OF THE PREFERRED EMBODIMENTS

Figure 1:
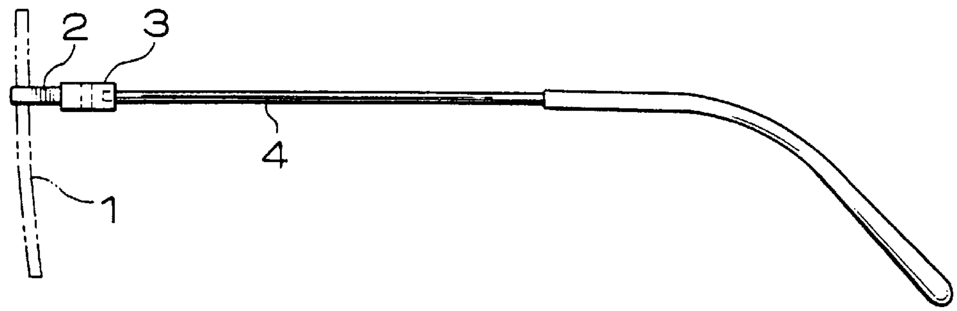
FIG. 1 is a side view of a pair of eyeglasses using lens-to-temple joint structures according to a first embodiment of the present invention.
Figure 2:
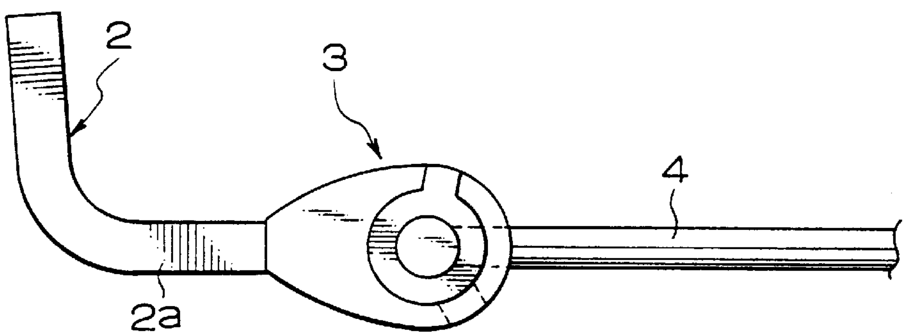
FIG. 2 is a plan view of the lens-to-temple joint structure used in FIG. 1.

FIGS. 1 to 9 show a lens-to-temple joint structure A for fixing a temple rotatably to each lens 1 in a pair of glasses according to a first embodiment of the present invention. Referring to FIG. 1, a temple 4 is hinged to an associated lens 1.

The lens 1 is made of glass or plastic material, and it has a temple-fastening aperture (not shown) made at a predetermined position. The aperture is square, so that the temple 4 when fixed to the lens 1 with a hook-like joint piece 2 may be prevented from rotating about the temple-fastening aperture. The temple 4 is made of nickel alloy or titanium.

The lens-to-temple joint structure A comprises a ring-like piece 3*a* having a hook-like joint extension 2*a* integrally formed thereto, an annular bush 3*c* of a flexible material such as a metal or hard synthetic resin and a hammer head-like projection 3*b* integrally connected to the temple 4. The annular bush 3*c* is so sized that it may be press-fitted in the ring-like piece 3*a*, and the hammer head-like projection 3*b* may be press-fitted in the annular bush 3*c*.

Figure 3:
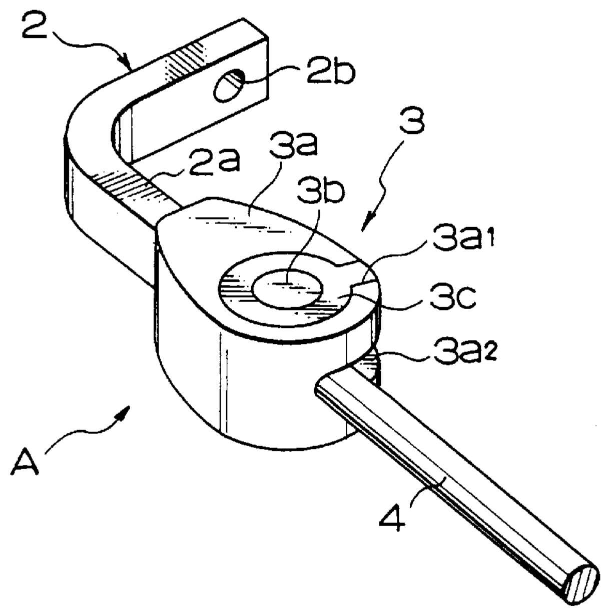
FIG. 3 is a perspective view of the lens-to-temple joint structure according to the first embodiment.
Figure 4:
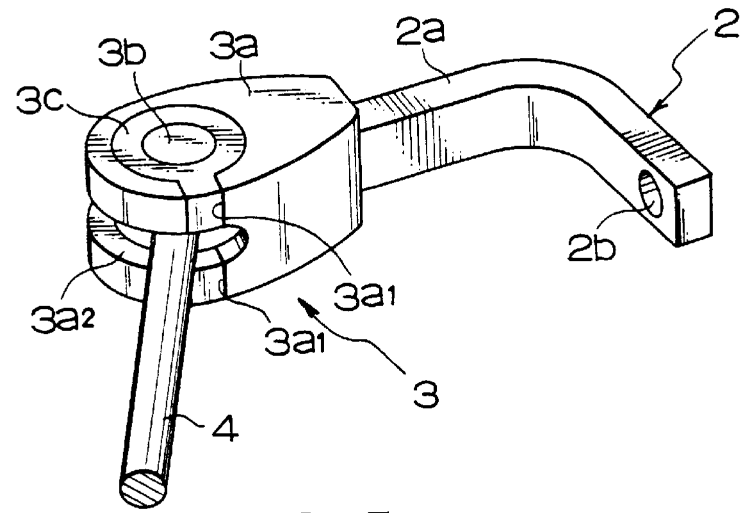
FIG. 4 is another perspective view of the lens-to-temple joint structure according to the first embodiment.

As seen from FIG. 3, the hook-like joint extension 2*a* has a fastening aperture 2*b* made at its end. The ring-like piece 3*a* can be fixed to the lens 1 by inserting a screw (not shown) in the fastening aperture 2*b* of the hook-like joint extension 2*a* and the square fastening aperture of the lens 1, and by driving the screw to fasten tightly the hook-like joint extension 2*a* to the lens 1.

The ring-like piece 3*a* is made of a metal or a synthetic resin, and has a vertical fixing slot $3a_1$ made in its circumference and a horizontal rotation-permitting slot $3a_2$ in its circumference. As best seen from FIG. 4, the vertical fixing slot $3a_1$ is made vertically in the circumference of the ring-like piece 3*a*, running from its top to bottom surface to permit the temple 4 to be guided to the horizontal rotation-permitting slot $3a_2$.

The horizontal rotation-permitting slot $3a_2$ is so made in the circumference of the ring-like piece 3*a* to permit the temple 4 to turn at least 90 degrees. More specifically the horizontal rotation-permitting slot $3a_2$covers the range long enough to permit the temple 4 to be folded on the front of a pair of eyeglasses (see FIG. 8) and to be extended straight in alignment with the hook-like joint extension 2*a* of the ring-like piece 3*a* (see FIG. 9).

Figure 5:
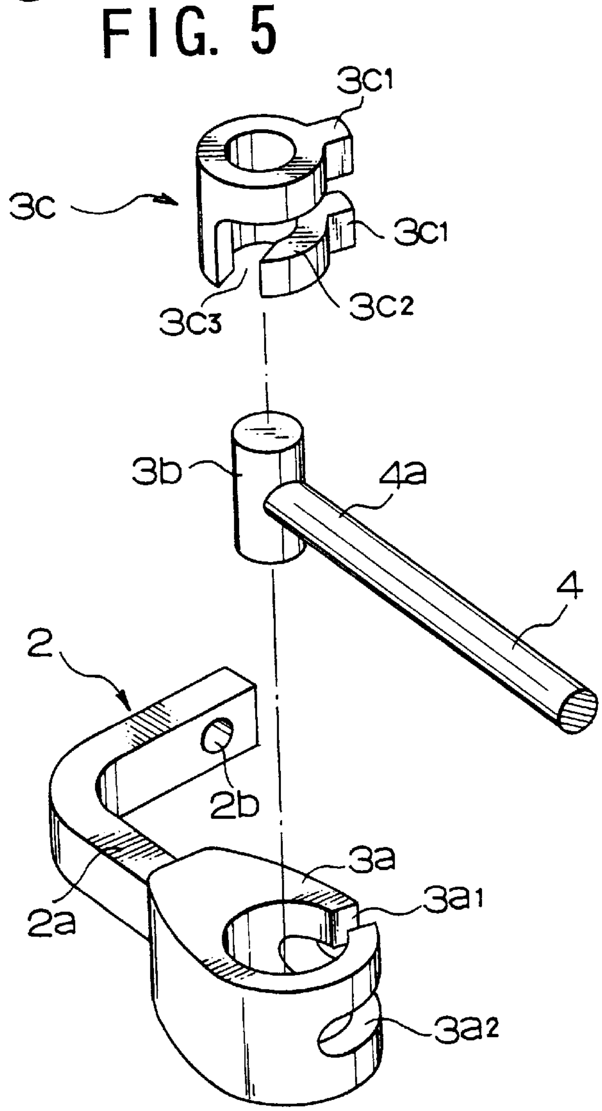
FIG. 5 is an exploded view of the lens-to-temple joint structure according to the first embodiment.

As seen from FIG. 5, the annular bush 3*c* has upper and lower detents $3c_1$, a horizontal slot $3c_2$and a vertical slot $3c_3$ all formed on its circumference. These upper and lower detents $3c_1$ are so formed that they may be press-fitted in the vertical fixing slot $3a_1$ of the ring-like piece 3*a*, thereby preventing the annular bush 3*c* from turning in the ring-like piece 3*a*. Also, the horizontal slot $3c_2$ and vertical slot $3c_3$ are so formed that: when the annular bush 3*c* is press-fitted in the ring-like piece 3*a*, the horizontal slot $3c_2$ may be put in alignment with the horizontal rotation-permitting slot $3a_2$ of the ring-like piece 3*a*; and the vertical slot $3c_3$ may be closed by the ring-like piece 3*a*, although it is allowed open downward.

Figure 6:
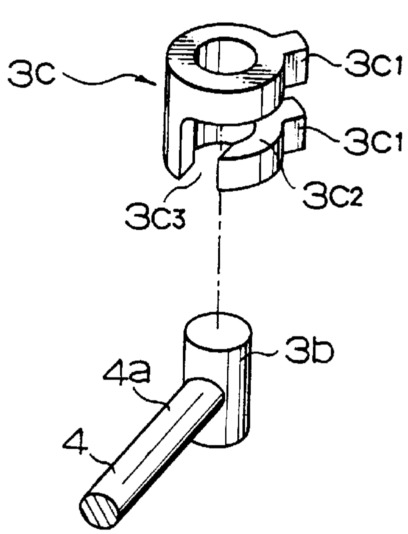
FIG. 6 is an exploded perspective view of the ring-like piece and the temple end.
Figure 7:
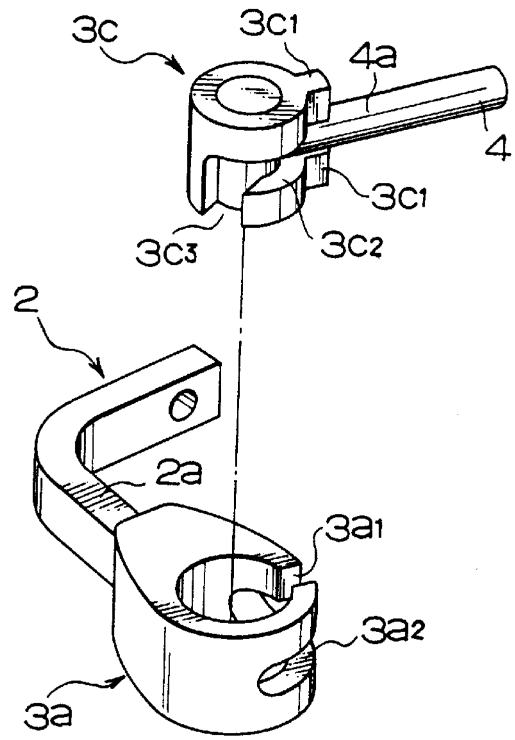
FIG. 7 is an exploded perspective view of the ring-like piece and the temple-and-annular bush assembly.
Figure 8:
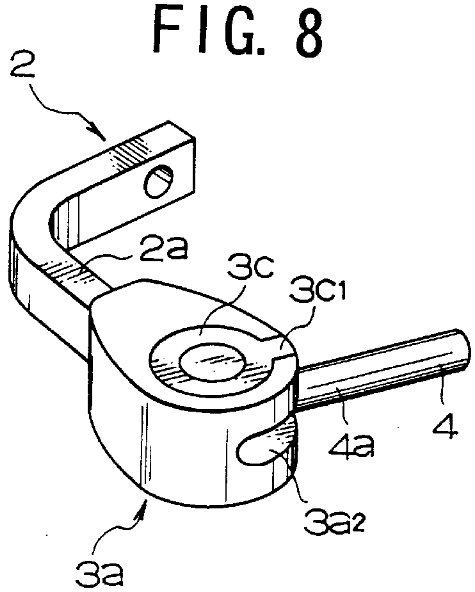
FIG. 8 is a perspective view of the lens-to-temple joint structure with the temple folded inward.
Figure 9:
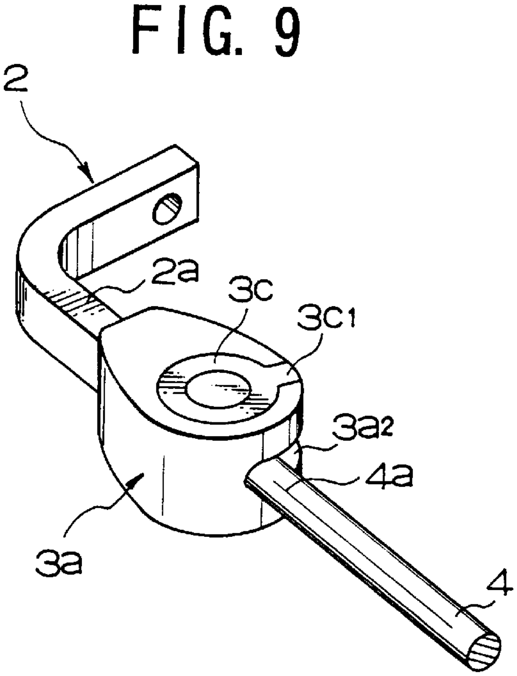
FIG. 9 is a perspective view of the lens-to-temple joint structure with the temple extended straight.

As seen from FIG. 6, the vertical slot $3c_3$ permits the hammer head-like projection 3*b* of the temple 4 to be fitted snugly in the annular bush 3*c*, thereby permitting the temple 4 to turn in the horizontal slot $3c_2$ of the annular bush 3*c*. The annular bush 3*c* having the hammer head-like projection 3*b* fitted therein (see FIG. 6) is fitted in the ring-like piece 3*a* (see FIG. 7) so that the temple 4 may be rotatably fixed to the ring-like piece 3*a*.

The pleasing tightness in rotating the temple can be provided by determining the inner diameter of the annular bush 3 and the outer diameter of the hammer head-like projection 3*b* relative to each other appropriately for the purpose.

FIGS. 10 to 13 show a lens-to-temple joint structure B according to a second embodiment of the present invention. In these drawings the same parts as in the first embodiment are indicated by the same reference numerals as used in FIGS. 1 to 9, but parts which are not used in the first embodiment are indicated by new reference numerals.

Figure 10:
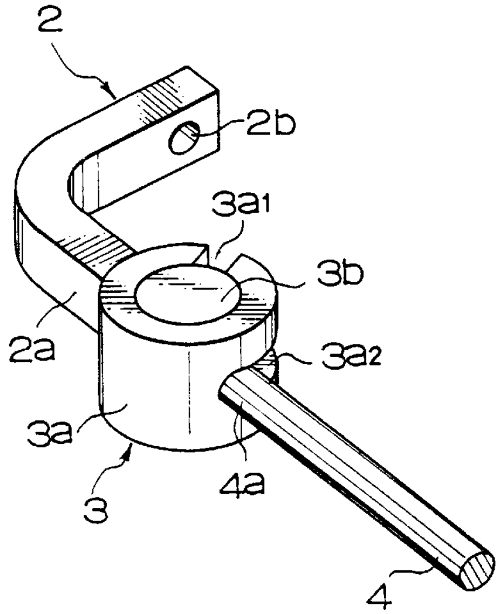
FIG. 10 is a perspective view of a lens-to-temple joint structure according to a second embodiment of the present invention.

Referring to FIG. 10, the lens-to-temple joint structure B comprises a ring-like piece 3*a* having a hook-like joint extension 2*a* integrally formed thereto, and a hammer head-like projection 3*b* integrally connected to the temple 4. The cylindrical body of the ring-like piece 3*a* is made of a metal or synthetic resin, and it has a vertical fixing slot $3a_1$ and a horizontal rotation-permitting slot $3a_2$ made therein.

Figure 11:
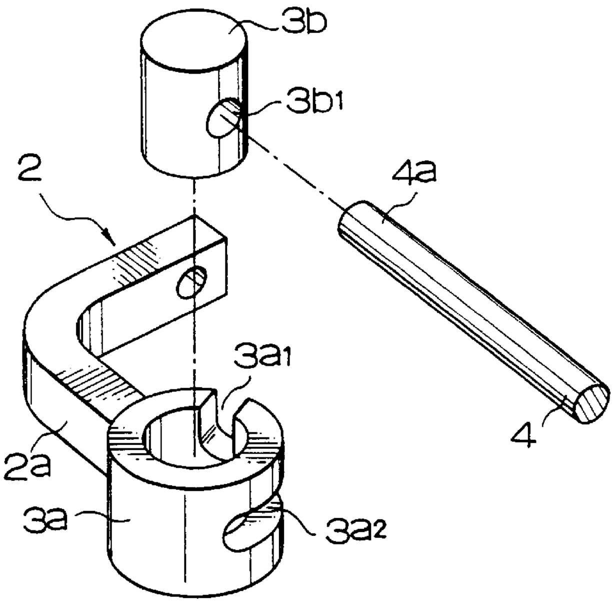
FIG. 11 is an exploded perspective view of the lens-to-temple joint structure according to the second embodiment.
Figure 12A:
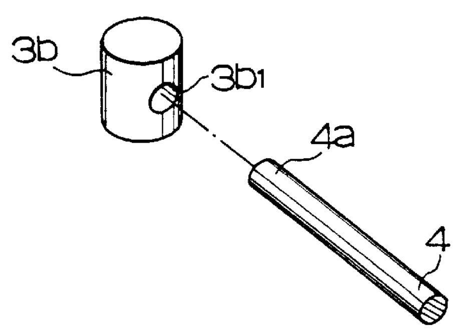
FIGS. 12*a* through 12*d* show how different pieces are assembled to a lens-to-temple joint structure according to the second embodiment.
Figure 12B:
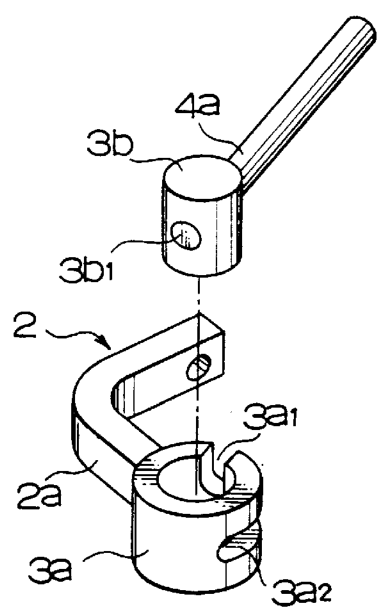
Figure 12C:
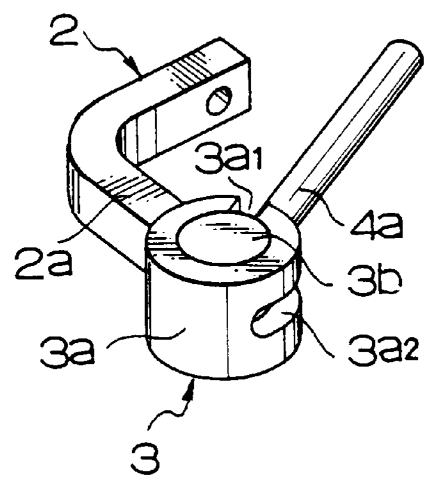
Figure 12D:
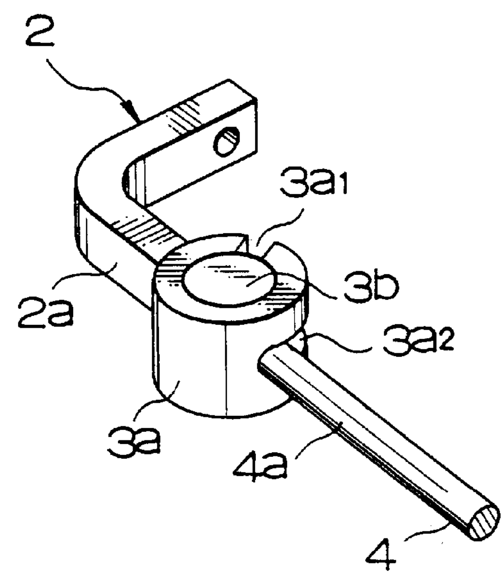
Figure 13:
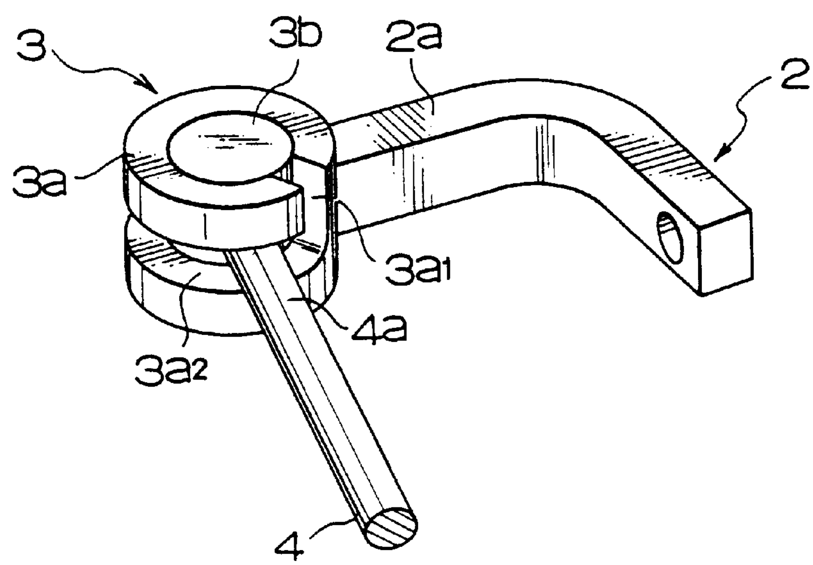
FIG. 13 is a perspective view of the lens-to-temple joint structure according to the second embodiment.

As seen from FIG. 11, the vertical fixing slot $3a_1$ extends from the top of the ring-like piece 3*a* down to the horizontal rotation-permitting slot $3a_2$, thereby permitting the temple 4 to be fitted detachably in the cylindrical body 3*a*. The horizontal rotation-permitting slot $3a_2$ expands an angle large enough to permit the temple 4 to turn at least 90 degrees inward, as is the case with the first embodiment.

The hammer head-like projection 3*b* is made of a metal or synthetic resin, and is integrally connected to the temple end 4*a*. The pleasing resistance to the turning of the temple can be provided by determining the inner diameter of the annular bush 3, the outer diameter of the hammer head-like projection 3*b* and the size of the horizontal rotation-permitting slot $3a_2$ relative to each other appropriately for the purpose.

Referring to FIG. 12, the temple end 4*a* is inserted into the hammer head-like projection 3*b* (FIG. 12-*a*), and the temple 4 is so oriented relative to the ring-like piece 3*a* that the temple 4 may be put in alignment with the vertical fixing slot $3a_1$ of the cylindrical body 3*a* (FIG. 12-*b*). Then, the hammer head-like projection 3*b* is fitted in the ring-like piece 3*a* (FIG. 12-*c*). Then, the temple 4 can be rotated 90 degrees in the horizontal rotation-permitting slot $3a_2$ (FIG. 12-*d*).

As may be understood from the above, a lens-to-temple joint structure according to the present invention requires neither soldering nor spot welding, which otherwise, would be required for instance, in using a hinge. Eyeglasses parts, therefore, can be jointed simply and reliably. Even if eyeglasses parts should be broken in assembling, such broken parts can be easily replaced by new ones. The lens-to-temple joint structure is so simple that mass production may be facilitated, and accordingly the manufacturing cost is lowered.

A part-to-part joint structure according to the present invention is described above as being applied to the lens-to-temple joint in a pair of rimless glasses, but it can be applied to the lens-to-temple joint in a pair of celluloid rimmed or metal/combination-rimmed glasses. Also, it can be used in parts to be articulated in a pair of glasses. All modifications which are obvious to those skilled in the art will fall within the scope of the present invention as defined in claims.

What is claimed is:

1. A lens-to-temple joint structure for fixing a temple to rotate relative to each lens in a pair of eyeglasses comprising:

(a) a ring-like piece having a joint extension integrally formed thereto for fixing to the lens;

(b) a hammer head-like projection integrally connected to the temple to be press-fitted in the ring-like piece; and (c) an annular bush of a flexible material, the annular bush being so sized that said annular bush may be press-fitted in the ring-like piece, and the hammer head-like projection may be press-fitted in the annular bush, thereby rotatably fixing the temple, wherein at least one of the ring-like piece and the annular bush has a horizontal slot made therein for permitting the temple to rotate in a limited range relative to the lens.

2. The lens-to-temple joint structure according to claim 1, wherein said ring-like piece has a horizontal slot.

3. The lens-to-temple joint structure according to claim 1, wherein said annular bush has a horizontal slot.

4. The lens-to-temple joint structure according to claim 1, wherein each of said ring-like piece and said annular bush have a horizontal slot aligned and commensurate in shape with each other.

5. The lens-to-temple joint structure according to claim 1, wherein said ring-like piece has a vertical slot.

6. The lens-to-temple joint structure according to claim 5, wherein said annular bush includes a detent which engages said vertical slot.

7. A part-to-part joint structure for fixing a first eyeglasses part to rotate relative to a second eyeglasses part in a pair of eyeglasses comprising:

(a) a ring-like piece having a joint extension integrally formed thereto for fixing to said first eyeglasses part;

(b) a hammer head-like projection integrally connected to said second eyeglasses part to be press-fitted in the ring-like piece; and (c) an annular bush of a flexible material, the annular bush being so sized that said annular bush may be press-fitted in the ring-like piece, and the hammer head-like projection may be press-fitted in the annular bush, thereby fixing said second eyeglasses part rotatably to said first eyeglasses part, wherein at least one of the ring-like piece and the annular bush has a horizontal slot made therein for permitting said second eyeglasses part to rotate in a limited range, relative to said first eyeglasses part .

8. The part-to-part joint structure according to claim 7, wherein said ring-like piece has a horizontal slot.

9. The part-to-part joint structure according to claim 7, wherein said annular bush has a horizontal slot.

10. The part-to-part joint structure according to claim 7, wherein each of said ring-like piece and said annular bush have a horizontal slot aligned and commensurate in shape with each other.

11. The part-to-part joint structure according to claim 7, wherein said ring-like piece has a vertical slot.

12. The part-to-part joint structure according to claim 11, wherein said annular bush includes a detent which engages said vertical slot.

* * * * *